United States Patent
Strian et al.

(10) Patent No.: US 8,950,947 B2
(45) Date of Patent: Feb. 10, 2015

(54) NON-MAGNETIZABLE ROLLING BEARING COMPONENT OF AN AUSTENITIC MATERIAL AND METHOD OF MAKING SUCH A ROLLING BEARING COMPONENT

(75) Inventors: Ernst Strian, Kunreuth (DE); Stefan Birkner, Neuhaus (DE); Ralf Winter, Nürnberg (DE); Julia (Amberger) Hermann, Nürnberg (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 1517 days.

(21) Appl. No.: 12/322,774

(22) Filed: Feb. 6, 2009

(65) Prior Publication Data

US 2009/0202187 A1 Aug. 13, 2009

(30) Foreign Application Priority Data

Feb. 8, 2008 (DE) .......................... 10 2008 008 113

(51) Int. Cl.
F16C 33/00 (2006.01)
C23C 8/22 (2006.01)
C23C 8/20 (2006.01)
C22C 38/04 (2006.01)
F16C 33/62 (2006.01)
F16C 33/64 (2006.01)

(52) U.S. Cl.
CPC . *C23C 8/20* (2013.01); *C22C 38/04* (2013.01); *F16C 33/62* (2013.01); *F16C 33/64* (2013.01)
USPC ........... 384/548; 384/492; 229/319; 229/334; 229/406

(58) Field of Classification Search
USPC ......... 384/492, 458, 568–569, 625, 912–913; 148/235, 318, 333, 540, 609, 327, 905, 148/229, 319, 334, 406
See application file for complete search history.

(56) References Cited

U.S. PATENT DOCUMENTS

| | | | | |
|---|---|---|---|---|
| 3,112,195 A * | 11/1963 | Souresny | ...................... | 148/327 |
| 3,784,418 A * | 1/1974 | Randak et al. | ................ | 148/547 |
| 3,904,401 A * | 9/1975 | Mertz et al. | ..................... | 420/42 |
| 4,502,886 A * | 3/1985 | Cordea et al. | ................... | 420/58 |
| 4,514,236 A * | 4/1985 | Cook et al. | ..................... | 148/609 |
| 4,705,990 A * | 11/1987 | Agoston et al. | ............ | 315/39.55 |
| 4,888,065 A * | 12/1989 | Grell | ............................. | 148/225 |
| 5,292,200 A * | 3/1994 | Matsumoto et al. | .......... | 384/492 |
| 5,413,643 A * | 5/1995 | Murakami et al. | ............ | 148/319 |
| 5,714,115 A * | 2/1998 | Speidel et al. | .................. | 420/65 |
| 6,759,759 B2 * | 7/2004 | Kojima et al. | ............... | 307/10.1 |
| 6,953,627 B2 * | 10/2005 | Junius | .......................... | 428/682 |
| 7,122,086 B2 * | 10/2006 | Tanaka et al. | ................. | 148/235 |

(Continued)

FOREIGN PATENT DOCUMENTS

| | | | | |
|---|---|---|---|---|
| EP | 1178123 A1 * | 2/2004 | ................ | C21D 8/12 |
| JP | 07190072 A * | 7/1995 | .............. | F16C 33/64 |

(Continued)

*Primary Examiner* — Marcus Charles
(74) *Attorney, Agent, or Firm* — Volpe and Koenig, P.C.

(57) ABSTRACT

A non-magnetizable rolling bearing component made of an austenitic material and comprising a hardened surface layer wherein the component of the invention is a material used for making the component contains manganese and a method for making such a rolling bearing component wherein the surface-proximate layer of the material of the rolling bearing component contains an admixture of manganese, is carburized at an elevated temperature in an oxygen-rich atmosphere and the rolling bearing component is then cooled.

8 Claims, 1 Drawing Sheet

(56) References Cited

U.S. PATENT DOCUMENTS 8,083,868 B2 * 12/2011 Fujita ............................ 148/318
2008/0318083 A1 * 12/2008 Berns et al. ................... 428/685

FOREIGN PATENT DOCUMENTS

| JP | 09133128 A | * | 5/1997 | ............. F16C 19/00 |
| WO | WO 2008108248 A1 | * | 9/2008 | ............. F16C 19/30 |

* cited by examiner

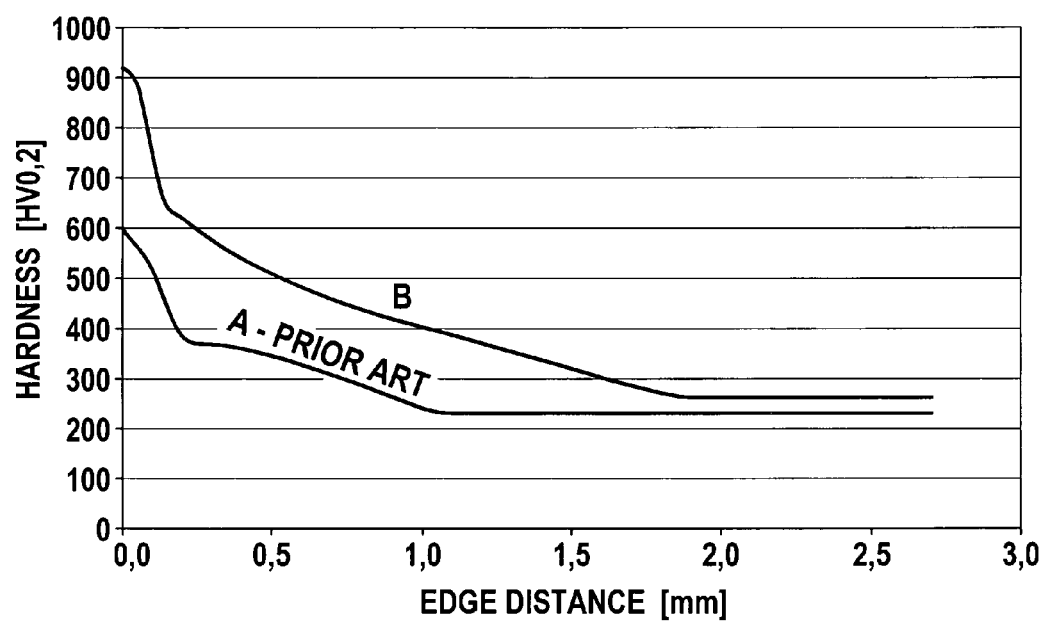

NON-MAGNETIZABLE ROLLING BEARING COMPONENT OF AN AUSTENITIC MATERIAL AND METHOD OF MAKING SUCH A ROLLING BEARING COMPONENT

FIELD OF THE INVENTION

The invention concerns a non-magnetizable rolling bearing component made of an austenitic material and comprising a hardened surface layer. The invention further concerns a method of making such a rolling bearing component.

BACKGROUND OF THE INVENTION

Non-magnetizable components of the pre-cited type are used, for instance, in highly sensitive magnetic fields or applications. Non-magnetizable rolling bearing components are also used, for example, in electromechanical appliances at locations where the magnetic flux must not be interrupted. Another reason for their use is their relatively high corrosion resistance.

It is known from the prior art to enhance the hardness of rolling bearing components by work hardening methods. A drawback of these methods is, however, that work hardening methods that lead to hardness values of more than 450 HV cause the formation of deformation martensite in the microstructure of the rolling bearing component. This renders the component magnetizable, so that it can no longer be used in applications in which non-magnetizable components with higher load capacity are required. Due to the only low hardness values achievable by work hardening, rolling bearing components made by these methods possess a load bearing capacity of approximately only 25% of that of comparable conventional rolling bearing components.

DE 35 37 658 C2 discloses a method of making a hardened, non-magnetizable rolling bearing component out of an austenitic material. In this method, the surface-proximate layer of the material of the rolling bearing component is carburized at elevated temperature in an oxygen-rich atmosphere and subsequently cooled. This prior art document also describes a rolling bearing component made by the described method. The rolling bearing component can be made of one of the following austenitic materials: X 5 CrNi 18 9, X 12 CrNiS 18 8, X 12 CrNi 17 7 or X 10 CrNiTi 18 9. The method enables surface hardness values of about 550 to 600 HV.

The quality of hardened components depends to a great extent on the depth of their hardness. It is true that with the method known from the prior art document DE 35 37 658 C2 good surface hardness values can be achieved but, already at a slight depth, only comparatively low hardness values are determined. In addition, for the carburization treatment, the prior art method requires relatively long sojourn times in the furnace. The small depths of precipitation hardness obtained in prior art materials limit the use of such materials considerably.

SUMMARY

It is therefore a first object of the present invention to provide a hardened non-magnetizable rolling bearing component made of an austenitic material and possessing a greater depth of precipitation hardness than in known solutions. A second object of the present invention is to provide a method of making a hardened non-magnetizable rolling bearing component.

These and other objects and advantages of the present invention will become more obvious from the following detailed description.

The invention achieves its first object by the fact that the material contains manganese. The second object of the invention is achieved by the fact that a surface-proximate layer of the material of the rolling bearing component is carburized at an elevated temperature in an oxygen-rich atmosphere and subsequently cooled, and that the material of the rolling bearing component comprises an admixture of manganese.

BRIEF DESCRIPTION OF THE DRAWING

FIG. 1 shows a comparison of the hardness versus edge distance of materials A and B.

DETAILED DESCRIPTION

The rolling bearing component of the invention made of an austenitic material possesses a hardened surface layer and is characterized in that the material used contains manganese. By this are to be understood manganese fractions in the material that are so large that they lead to a technically relevant change in the properties of the material. A manganese content of 12% to 22% has proved to be particularly advantageous. It is also of advantage if the hardened surface layer is carburized.

The rolling bearing component of the invention can be configured, for example, as an inner ring, an outer ring or even as rolling elements of a rolling bearing.

A particular advantage of the solution offered by the invention is that by using manganese, a substantially greater depth of precipitation hardness than in hitherto used materials can be achieved. For instance, it is possible to obtain surface hardness values of more than 700 HV. This widens the scope of use of the rolling bearing component of the invention. The invention makes it possible to use hardened non-magnetizable rolling bearing components without any problem in instances in which, due to the relatively small depth of precipitation hardness, this was not possible in the past. In such fields of application, ceramic bearings that have a high purchase price are used at present. Therefore, and not least of all, the use of the rolling bearing component of the invention also leads to a considerable reduction of costs.

In an advantageous embodiment of the invention, the material used is X 8 CrMn 18-18 (Material Number 1.3816 according to Euronorm-ZRM). This material enables surface hardness values of approximately 900 HV. However, this is not to be considered as a restriction of the invention. Other materials having a suitable manganese content can likewise be used.

In another advantageous embodiment of the invention, the base material of the rolling bearing component further contains molybdenum, and a molybdenum fraction of 2% to 5% has proved to be particularly advantageous. In addition to, or in place of molybdenum, in further embodiments of the invention, the material of the rolling bearing component can also contain a nitrogen fraction. Advantageously this nitrogen fraction is 0.2% to 1%. Through an additional alloying with molybdenum and/or nitrogen, the depth of precipitation hardness and the core strength of the component can be further augmented. Besides this, the austenite can be additionally stabilized. X 13 CrMn Mo N 18-14-3 (Material Number 1.4452) can be used, for example, as the base material. This material, too, is only stated as an example of embodiment. Other suitable materials with additional molybdenum and/or nitrogen fractions can likewise be used.

It has further proved to be advantageous if the rolling bearing component of the invention is suitable for use in mounting arrangements in magnetic fields. Typical fields of use of the rolling bearing component of the invention are, for example, special bearings for continuous casting equipment in which greater precipitation hardness depths are required, such as in linear technology, vehicles, rails, mechatronic systems as also non-magnetizable actuators. The rolling bearing component of the invention can be used in high-temperature fields of use. In addition, it can also be used in steel parts together with aluminum materials (similar expansion coefficient). However, the use of the invention is not limited to the named fields of application; other fields of application are by all means conceivable.

In the method of the invention for making a hardened non-magnetizable rolling bearing component, the surface-proximate layer of material of the rolling bearing component is at first carburized at an elevated temperature of, for instance, 900° C. in a technically oxygen-rich atmosphere. In a next step, the rolling bearing component is cooled. The method of the invention is characterized in that the austenitic material used contains an admixture of manganese. Through the admixture of manganese, a substantially larger depth of precipitation hardness can be obtained than with prior art methods. The precipitation hardness depth of the rolling bearing component can be further enhanced by an additional admixture of molybdenum and/or nitrogen.

Further advantages, details and developments of the present invention result from the following description of a preferred embodiment, with reference to the appended drawing.

The sole FIG. 1 shows the hardness curve of a material B used to make the rolling bearing component of the invention compared to a material A used in the prior art for making rolling bearings. The material A of the prior art is X 2 CrNiMo 18-14-3. This material A possesses a surface hardness of approximately 600 HV. At an edge distance of about 0.2 mm, the hardness is only about 400 HV. At an edge distance of 1 mm, a hardness of about 230 HV is reached. In the present example of embodiment of the component of the invention, X 8 CrMn 18-18 is used as material B. With this material B, a substantially higher surface hardness can be obtained than with the material A of the prior art. The surface hardness achieved with the material B of the invention is approximately 920 HV. At an edge distance of 0.2 mm, a hardness of 620 HV is still achieved. The hardness at an edge distance of 1 mm is about 400 HV, and at an edge distance of 2 mm, the hardness is still about 260 HV.

The precipitation hardness depth achievable can be further augmented by an additional admixture of manganese and/or nitrogen fractions to the material.

The invention claimed is:

1. A non-magnetizable rolling bearing component made of an austenitic material and comprising a hardened surface layer, wherein the said material comprises a manganese fraction of 12% to 22%, and a molybdenum fraction of more than 2% and less than or equal to 5%.

2. A rolling bearing component of claim 1, wherein the hardened surface layer is carburized.

3. A rolling bearing component of claim 1, wherein the material further comprises nitrogen.

4. A rolling bearing component of claim 3, wherein the material comprises a nitrogen fraction of 0.2% to 1%.

5. A rolling bearing component of claim 3, wherein the material is X 13 CrMo 18-14-3.

6. A rolling bearing component of claim 1, wherein the material is X 8 CrMn 18-18.

7. A rolling bearing component of claim 1 wherein the material is slewing connection, and the rolling bearing component can be used in mounting arrangements in magnetic fields.

8. A rolling bearing component of claim 1 wherein the hardened surface layer has a surface hardness of at least 700 HV.

* * * * *